United States Patent
Narita et al.

(10) Patent No.: US 11,012,611 B2
(45) Date of Patent: May 18, 2021

(54) ELECTRONIC APPARATUS, CONTROL METHOD, AND STORAGE MEDIUM

(71) Applicant: CANON KABUSHIKI KAISHA, Tokyo (JP)

(72) Inventors: Yu Narita, Yokohama (JP); Yoshinori Hayashi, Tokyo (JP); Koichi Sasaki, Yokohama (JP); Dai Miyauchi, Chiba (JP); Tomotaka Uekusa, Yokohama (JP); Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/698,316

(22) Filed: Nov. 27, 2019

(65) Prior Publication Data

US 2020/0177795 A1 Jun. 4, 2020

(30) Foreign Application Priority Data

Nov. 29, 2018 (JP) .............................. JP2018-224129

(51) Int. Cl.
*H04N 5/232* (2006.01)
*G08B 3/10* (2006.01)

(52) U.S. Cl.
CPC ........... *H04N 5/23216* (2013.01); *G08B 3/10* (2013.01); *H04N 5/232933* (2018.08); *H04N 5/232941* (2018.08)

(58) Field of Classification Search
CPC ............................................... H04N 5/232941

USPC ..................................................... 348/333.01
See application file for complete search history.

(56) References Cited

U.S. PATENT DOCUMENTS

2009/0231457 A1* 9/2009 Lee ..................... H04N 5/23219
348/222.1
2016/0295107 A1* 10/2016 Kinoshita .......... H04N 5/23222
2016/0330366 A1* 11/2016 Kinoshita ........ H04N 5/232945

FOREIGN PATENT DOCUMENTS

JP 06-82870 A 3/1994

\* cited by examiner

*Primary Examiner* — Anthony J Daniels
(74) *Attorney, Agent, or Firm* — Canon U.S.A., Inc. I.P. Division

(57) ABSTRACT

An electronic apparatus including an imaging unit, an operation unit, an output unit, and a control unit, wherein the control unit outputs a sound relating to a first warning using the output unit, in a case where a condition for issuing the first warning is satisfied, wherein the control unit stops outputting the sound relating to the first warning, in a case where an instruction is received by the operation unit, wherein the control unit doesn't output the sound relating to the first warning even when the condition for issuing the first warning is satisfied, in a case where the output of the sound relating to the first warning is stopped, and wherein the control unit outputs a sound relating to a second warning, when a condition for issuing the second warning is satisfied, in a case where the output of the sound relating to the first warning is stopped.

20 Claims, 7 Drawing Sheets

FIG.3A

| WARNING TYPE | CURRENT LEVEL | CONTENT OF FIRST WARNING | THRESHOLD T0 | THRESHOLD T1 |
|---|---|---|---|---|
| A | 0 | BATTERY CAPACITY | REMAINING BATTERY LEVEL OF 30% | REMAINING BATTERY LEVEL OF 10% |
| B | 0 | IMAGE DATA RECORDABLE CAPACITY | CAPACITY OF 1GB | CAPACITY OF 500MB |
| C | 0 | IMAGE CAPTURING MODE | — | — |
| D | 1 | CAMERA SHAKE AMOUNT | SMALL ANGULAR VELOCITY | LARGE ANGULAR VELOCITY |
| E | 0 | CAMERA TILT AMOUNT | SMALL ACCELERATION | LARGE ACCELERATION |
| F | 0 | EXPOSURE AMOUNT | PROPER VALUE ± 2 | PROPER VALUE ± 4 |

FIG.3B

| WARNING TYPE | CURRENT LEVEL | CONTENT OF SECOND WARNING | THRESHOLD T0 | THRESHOLD T1 |
|---|---|---|---|---|
| D | 2 | CAMERA SHAKE AMOUNT | SMALL ANGULAR VELOCITY | LARGE ANGULAR VELOCITY |
| E | 0 | CAMERA TILT AMOUNT | SMALL ACCELERATION | LARGE ACCELERATION |
| F | 0 | EXPOSURE AMOUNT | PROPER VALUE ± 2 | PROPER VALUE ± 4 |

FIG.4

| STATE | WARNING TYPE | RELATIONSHIP BETWEEN WARNING LEVELS | WHETHER TO NOTIFY SECOND WARNING |
|---|---|---|---|
| 0 | — (NO FIRST WARNING) | — (NO FIRST WARNING) | NOTIFY |
| 1 | DIFFERENT | ARBITRARY | NOTIFY |
| 2 | SAME | LEVEL OF FIRST WARNING ≥ LEVEL OF SECOND WARNING | NOT NOTIFY |
| 3 | SAME | LEVEL OF FIRST WARNING < LEVEL OF SECOND WARNING | NOTIFY |

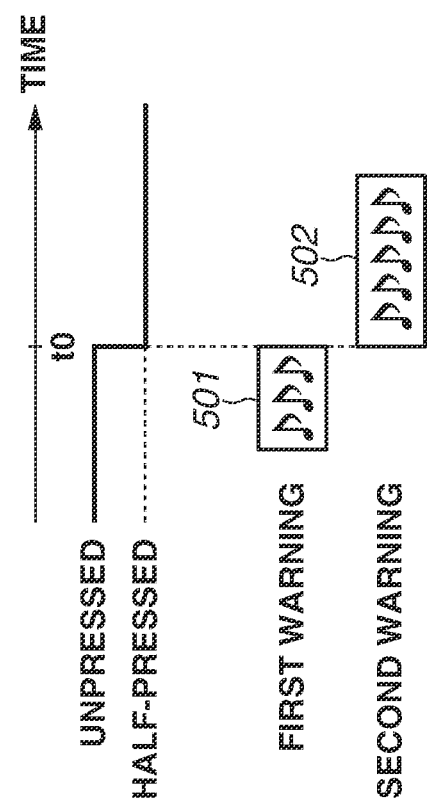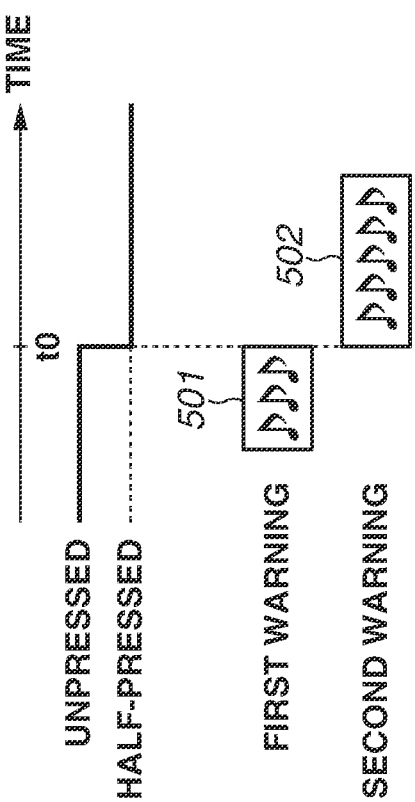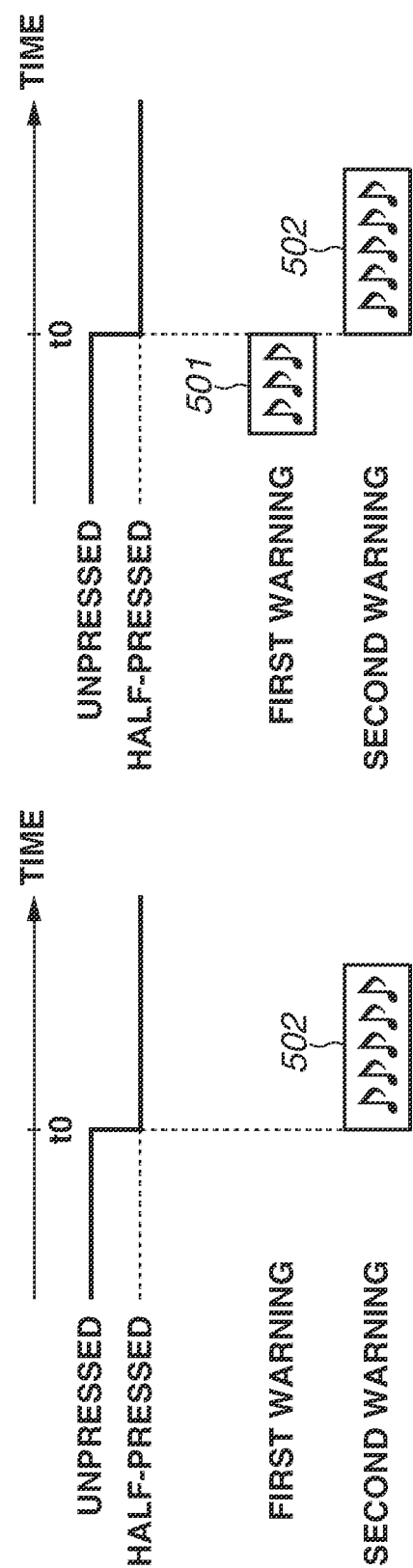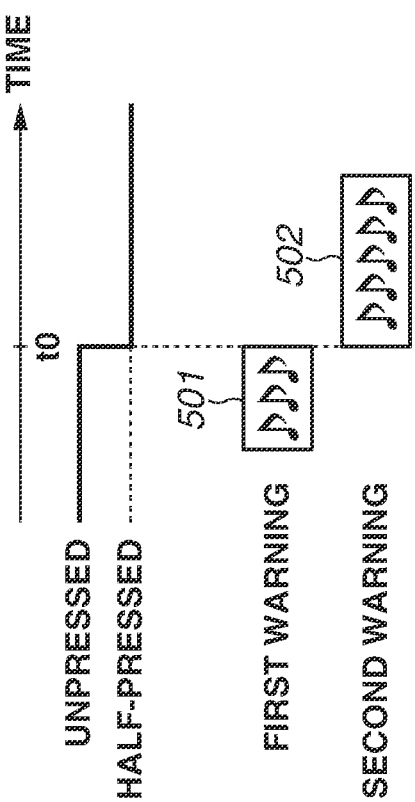

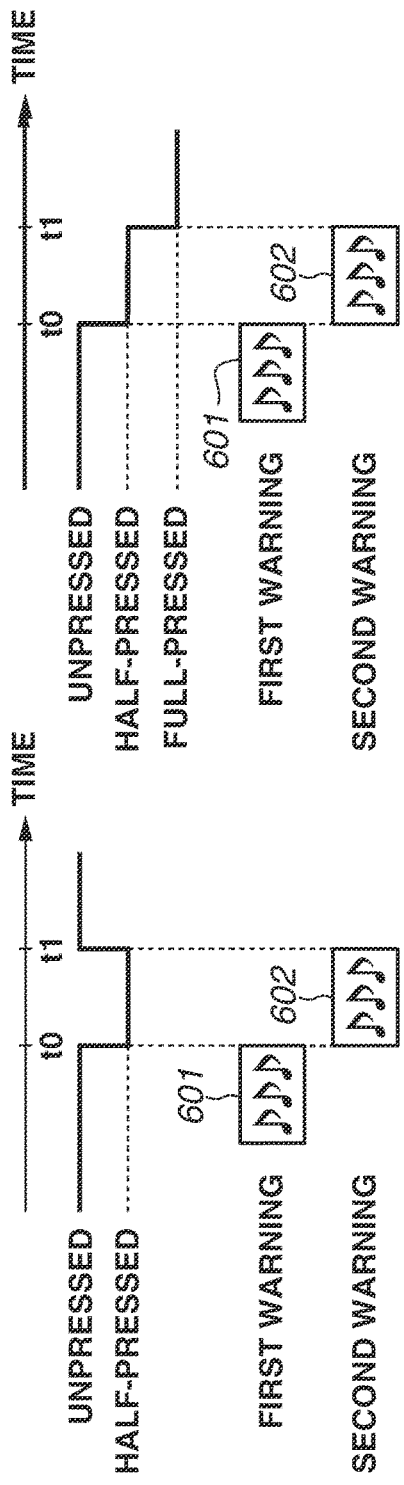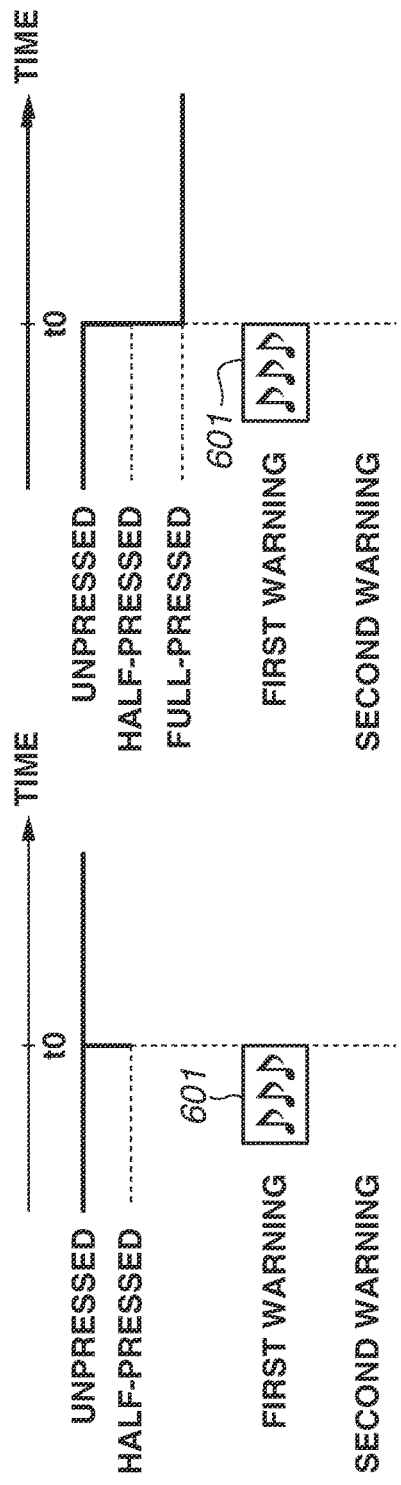

ELECTRONIC APPARATUS, CONTROL METHOD, AND STORAGE MEDIUM

BACKGROUND

Field of the Disclosure

The present disclosure relates to an electronic apparatus capable of outputting a sound.

Description of the Related Art

In these days, a digital camera is capable of predicting a failure resulting from a cause such as a camera shake or over or under exposure, and of warning a user about the predicted failure.

Japanese Patent Application Laid-Open No. H06-82870 discusses a camera that detects the possibility of occurrence of blurring in an image caused by a camera shake, and outputs a warning sound.

For example, the warning can be output in each of a case where a user tries to decide framing of the camera and a case where the user starts preparing for image capturing based on the determined framing. In such a situation, the user understands the content of the warning when receiving the first warning. Accordingly, the second warning in particular may annoy the user. In this way, if a user is notified of a warning every occasion, the user may be notified of an unnecessary warning.

SUMMARY

According to an aspect of the present disclosure, an electronic apparatus including an imaging unit, an operation unit configured to receive a preparation instruction for causing the imaging unit to execute preparation operation for imaging and an imaging instruction for causing the imaging unit to execute imaging operation, based on a user operation, an output unit configured to output a sound, and a control unit, wherein the control unit outputs a sound relating to a first warning using the output unit, in a case where a condition for issuing the first warning is satisfied, wherein the control unit stops outputting the sound relating to the first warning, in a case where the preparation instruction is received by the operation unit while the sound relating to the first warning is being output by the output unit, wherein the control unit does not output the sound relating to the first warning even when the condition for issuing the first warning is satisfied, in a case where the output of the sound relating to the first warning is stopped because of receiving the preparation instruction by the operation unit, and wherein the control unit outputs a sound relating to a second warning different from the first warning using the output unit, when a condition for issuing the second warning is satisfied, in a case where the output of the sound relating to the first warning is stopped because of receiving the preparation instruction by the operation unit.

Further features of the present disclosure will become apparent from the following description of exemplary embodiments with reference to the attached drawings.

BRIEF DESCRIPTION OF THE DRAWINGS

FIG. 3A is a table illustrating examples of the content of a first warning and examples of a condition for issuing the first warning notification, and FIG. 3B is a table illustrating examples of the content of a second warning and examples of a condition for issuing the second warning notification.

FIG. 4 is a table illustrating examples of a state of the digital camera.

FIG. 5A is a diagram illustrating an example of warning notification in a case where the digital camera is in a state 0, FIG. 5B is a diagram illustrating an example of warning notification in a case where the digital camera is in a state 1, FIG. 5C is a diagram illustrating an example of warning notification in a case where the digital camera is in a state 2, and FIG. 5D is a diagram illustrating an example of warning notification in a case where the digital camera is in a state 3.

FIG. 6A is a diagram illustrating an example of warning notification in a case where a half-pressed state of a release switch is canceled and the release switch is changed to an unpressed state, FIG. 6B is a diagram illustrating an example of warning notification in a case where the release switch is changed from the half-pressed state to the full-pressed state, FIG. 6C is a diagram illustrating an example of warning notification in a case where the release switch is half-pressed for a moment, and FIG. 6D is a diagram illustrating an example of warning notification in a case where the release switch is pressed at a stroke.

DESCRIPTION OF THE EMBODIMENTS

Exemplary embodiments of the present disclosure will be described below with reference to the drawings.

Figure 1A:
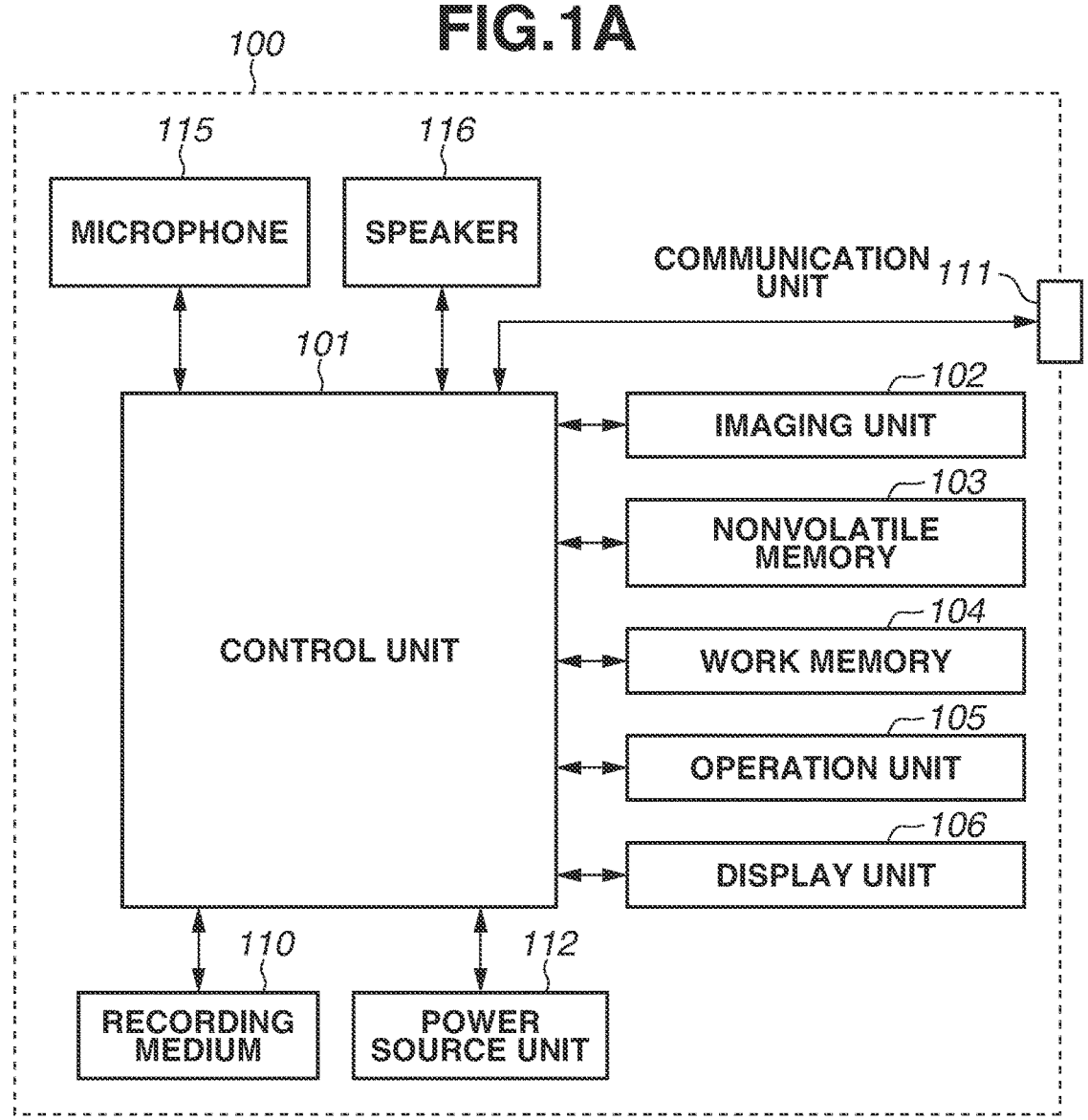
FIG. 1A is a block diagram illustrating an example of a configuration of a digital camera according to a first exemplary embodiment.

FIG. 1A is a block diagram illustrating a configuration example of a digital camera 100 serving as an example of an electronic apparatus according to a first exemplary embodiment. In the present exemplary embodiment, a digital camera is employed as an example of the electronic apparatus, but the electronic apparatus is not limited thereto. Examples of the electronic apparatus include a smartphone and a tablet terminal. The electronic apparatus of the present exemplary embodiment is suitable for, in particular, an imaging apparatus having an image sensor, and a portable device.

A control unit 101 controls each unit of the digital camera 100, based on an input signal, or a program to be described below. In place of the control unit 101, a plurality of pieces of hardware may control the entire apparatus by sharing processing.

An imaging unit 102 includes an optical system and an image sensor. The optical system controls an optical lens unit and an aperture, zooming, and focusing. The image sensor converts light (video image) guided through the optical lens unit into an electric image signal. Typically, a complementary metal oxide semiconductor (CMOS) sensor or a charge coupled device (CCD) sensor is used as the image sensor. The imaging unit 102 is controlled by the control unit 101 to convert object light focused by a lens included in the imaging unit 102 into an electrical signal using the image sensor, and output digital data as image data by performing processing such as noise reduction processing. A series of processes of imaging and outputting image data in the present exemplary embodiment will be referred to as "image capturing". In the digital camera 100 according to the present exemplary embodiment, the image data is recorded into a recording medium 110 to be described below, according to the Design rule for Camera File system (DCF) standard.

A nonvolatile memory 103 is an electrically erasable and recordable nonvolatile memory, and stores, for example, a program to be executed by the control unit 101. This program will be described below.

A work memory 104 is used as, for example, a buffer memory that temporarily holds image data resulting from imaging by the imaging unit 102, an image display memory of a display unit 106, and a work area of the control unit 101.

An operation unit 105 is a user interface for receiving an instruction for the digital camera 100 from a user. The operation unit 105 can include a power button for the user to provide an instruction for turning on/off the power of the digital camera 100, a release switch for providing an instruction for performing image capturing, and a playback button for providing an instruction for playing back the image data. The operation unit 105 can further include a touch panel to be formed on the display unit 106. The release switch includes switches SW1 and SW2. The switch SW1 is turned on when the release switch enters a half-pressed state. A preparation instruction for performing preparation operation for imaging is received through this operation. Examples of the preparation operation include automatic focus (AF) processing, automatic exposure (AE) processing, automatic white balance (AWB) processing, and electronic flash (EF), i.e., flash preliminary emission processing. The switch SW2 is turned on when the release switch enters a full-pressed state. An imaging instruction for performing imaging operation is received through such a user operation. The operation unit 105 further includes a mode selection switch, and thereby changes an operation mode of the control unit 101 to any of modes including a still image capturing mode, a moving image capturing mode, and a playback mode. The still image capturing mode includes an automatic image capturing mode, an automatic scene determination mode, a manual mode, an aperture priority mode (Av mode), a shutter-speed prioritized mode (Tv mode), and a program AE mode. Further, there are various scene modes each providing image capturing setting for the corresponding image capturing scene, and a custom mode. The user can directly change the mode to any of these modes, using the mode selection switch. Alternatively, the user may change the mode to a screen displaying a list of image capturing modes using the mode selection switch, select any one of the displayed modes, and change the mode to the selected mode using other operation member.

The display unit 106 displays, for example, a viewfinder image in image capturing, captured image data, and text for an interactive operation. The display unit 106 may not necessarily be built in the digital camera 100, and may be externally connected to the digital camera 100. The digital camera 100 may be at least capable of connecting to the internal or external display unit 106, and may have at least a function of controlling display of the display unit 106.

The recording medium 110 may be configured to be attachable to and detachable from the digital camera 100, or may be built in the digital camera 100. The digital camera 100 may at least have a unit for accessing the recording medium 110.

A communication unit 111 is an interface for connecting to an external apparatus. The digital camera 100 according to the present exemplary embodiment can exchange data with the external apparatus via the communication unit 111. For example, the digital camera 100 can transmit image data generated by the imaging unit 102 to the external apparatus via the communication unit 111. In the present exemplary embodiment, the communication unit 111 includes an interface for communicating with the external apparatus via a wireless local area network (LAN), according to the Institute of Electrical and Electronics Engineers (IEEE) 802.11 standard. The control unit 101 implements wireless communication with the external apparatus by controlling the communication unit 111. The communication method is not limited to the wireless LAN, and examples of the communication method include an infrared communication method.

A power source unit 112 can supply electric power to the components of the digital camera 100 under control by the control unit 101. The power source unit 112 is, for example, a battery such as a lithium ion battery.

A microphone 115 collects sound including voice of the user and ambient sound. The control unit 101 analyzes the sound collected by the microphone 115, so that the control unit 101 can execute processing appropriate to the collected sound. This will be referred to as a voice assistant function, in the present exemplary embodiment. In general, an apparatus having a voice assistant function recognizes a predetermined word (wake word) included in collected sound, and analyzes sound following the wake word. In the present exemplary embodiment, the digital camera 100 transmits the collected sound to a server connected via the communication unit 111, and analyzes the content of the sound, using the server. The digital camera 100 according to the present exemplary embodiment recognizes a wake word within the apparatus, and analyzes the content of sound following the wake word, using the server.

A speaker 116 can output sound such as music and a warning sound. In the present exemplary embodiment, the control unit 101 outputs a sound such as a warning sound, using the speaker 116. The user can recognize a notice such as a warning of the digital camera 100, by hearing the sound output from the speaker 116.

Figure 1B:
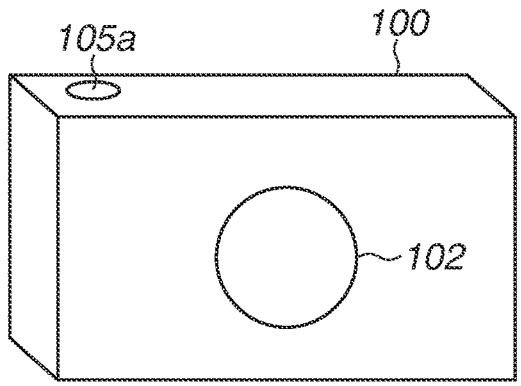
FIG. 1B is a diagram illustrating an example of an appearance of the digital camera as viewed from the front.
Figure 1C:
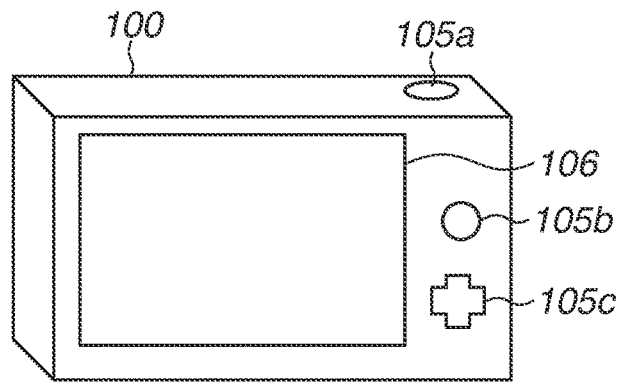
FIG. 1C is a diagram illustrating an example of an appearance of the digital camera as viewed from the back.

FIG. 1B is a diagram illustrating an example of an appearance of the digital camera 100 viewed from the front. FIG. 1C is a diagram illustrating an example of an appearance of the digital camera 100 viewed from the back. A release switch 105a, a playback button 105b, and an arrow key 105c are operation members included in the operation unit 105. The release switch 105a is disposed at a position allowing the user to operate the release switch 105a easily with the right hand and thus, the user can comfortably perform image capturing only with the right hand. The display unit 106 displays an image resulting from imaging by the imaging unit 102.

Figure 2:
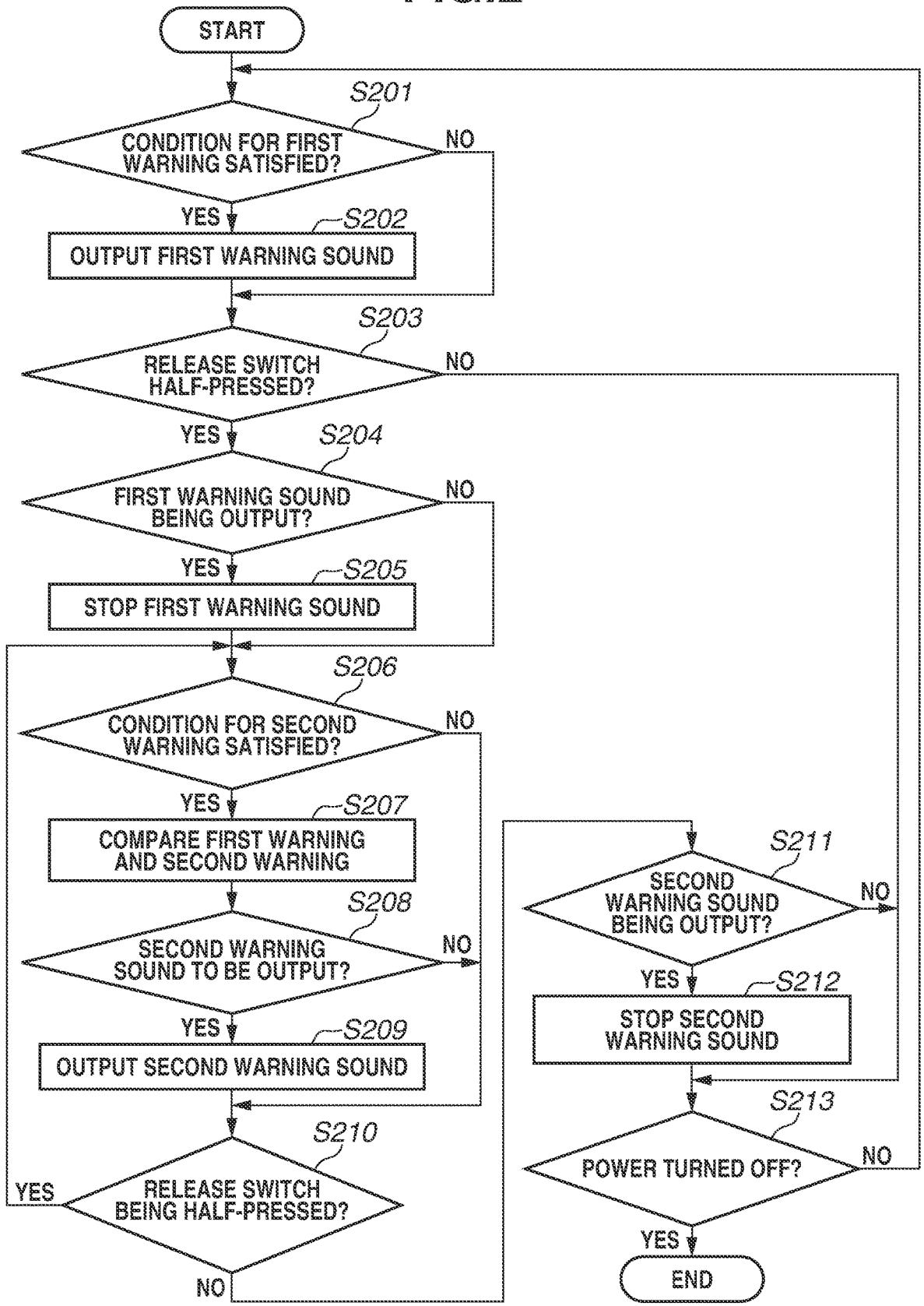
FIG. 2 is a flowchart illustrating an example of operation of the digital camera according to the first exemplary embodiment.

A flow of processing of the image capturing apparatus according to the first exemplary embodiment will be described below with reference to FIGS. 2, 3A, and 3B. FIG. 2 is a flowchart illustrating an example of the processing of the digital camera 100. The control unit 101 loads software recorded in the nonvolatile memory 103 into the work memory 104 and executes the loaded software, so that the processing in FIG. 2 is implemented. The user turns on the power button, and this triggers the processing in FIG. 2. At the start of this processing, the digital camera 100 is in the still image capturing mode, and the release switch is not pressed. This state is a standby state. FIG. 3A illustrates types of a warning to be issued by the digital camera 100 in the standby state. FIG. 3B illustrates types of a warning to be issued by the digital camera 100 in a state where the release switch is half-pressed. In the present exemplary embodiment, the warning to be issued by the digital camera 100 in the standby state will be referred to as the first warning, and the warning to be issued by the digital camera 100 in the state where the release switch is half-pressed will be referred to as the second warning. The first warning and the second warning will be described in detail below.

In step S201, the control unit 101 determines whether a condition for issuing the first warning is satisfied. If the control unit 101 determines that the condition for issuing the first warning is satisfied (YES in step S201), the processing proceeds to step S202. If the control unit 101 determines that the condition for issuing the first warning is not satisfied (NO in step S201), the processing proceeds to step S203. In the present exemplary embodiment, there is described a case where the control unit 101 determines that a warning about a camera shake is at a level 1 as illustrated in FIG. 3A.

Here, the first warning will be described. The first warning includes a warning about an operation state of the camera in the standby state and a warning about imaging are each provided. A condition for issuing the warning about the operation state of the camera is that, for example, a remaining battery level is low, a capacity for recording image data is low, or the image capturing mode is set to a specific mode such as a monochrome mode. A condition for issuing the warning about imaging is that, for example, a camera shake amount is large, a camera tilt amount is large, or an over or underexposure amount is large. The camera shake amount is obtained based on an output of an angular velocity sensor, the camera tilt amount is obtained based an output of an acceleration sensor, and the over- and under-exposure amount can be obtained based on a shutter speed, aperture value, and International Standards Organization (ISO) sensitivity by using the known methods.

Further, in the present exemplary embodiment, for example, a warning type and a level indicating a warning degree are set for each of the first warnings, as illustrated in FIG. 3A. In the present exemplary embodiment, this level is one of three levels 0, 1, and 2. The larger the numerical value of the level is, the greater the importance of the warning is. In addition, the warning types are arranged in descending order of priority. For example, a warning of a type A has higher priority than a warning of a type B if these warnings are at the same level. In the present exemplary embodiment, two thresholds T0 and T1 are set for each of the warnings. For example, the battery capacity for the type A is as follows. The battery capacity is at the level 0 if a remaining battery level X>the threshold T0 (remaining battery level 30%). The battery capacity is at the level 1 if the threshold T0>the remaining battery level X>the threshold T1 (remaining battery level 10%). The battery capacity is at the level 2 if the threshold T1>the remaining battery level X. In the present exemplary embodiment, the control unit 101 determines that the condition for issuing the warning is not satisfied for the level 0, and the condition for issuing the warning is satisfied for each of the level 1 and the level 2. Further, the level indicating the warning degree has higher priority than the warning type. For example, the warning of the type B at the level 2 is issued in preference to the warning of the type A at the level 1. Referring back to FIG. 2, the description of the flowchart will be continued.

In step S202, the control unit 101 starts notification of the warning to the user by outputting a sound. For example, the control unit 101 starts output of a voice message saying "the camera shake is large" as the warning, using the speaker 116. The digital camera 100 issues the warning here by reading the message aloud, so that the user readily understands the content of the warning. In a case where the plurality of first warnings is to be issued, the control unit 101 sequentially issues the first warnings, based on the priority and the level as described above. This warning corresponds to the first warning.

In step S203, the control unit 101 determines whether the release switch is half-pressed. If the control unit 101 determines that the release switch is half-pressed (YES in step S203), the processing proceeds to step S204. If the control unit 101 determines that the release switch is not half-pressed (NO in step S203), the processing proceeds to step S213.

In step S204, the control unit 101 determines whether the sound that the control unit 101 has started outputting in step S202 is still being output. If the control unit 101 determines that the sound is not being output (NO in step S204), the processing proceeds to step S206. If the control unit 101 determines that the sound is being output (YES in step S204), the processing proceeds to step S205. In a case where the process in step S202 is not executed, the control unit 101 determines that the sound is not being output.

In step S205, the control unit 101 stops outputting the sound that the control unit 101 has started outputting in step S202. The control unit 101 records the type of the first warning stopped here into the nonvolatile memory 103. This enables the user to stop the sound of the first warning only by half-pressing the release switch, in a case where the user feels that the sound of the first warning is unnecessary. Further, even if another first warning is on standby for notification, the control unit 101 does not issue this warning. Furthermore, because this release switch is a button for the user to perform image capturing, the user can stop the warning sound and start the image capturing. Moreover, as described above, the release switch is disposed at the position allowing an easy operation with the right hand and therefore, the user readily stops the warning sound even during the image capturing. The control unit 101 may display the warning on the display unit 106, when stopping the warning sound. This enables the user to understand the content of the warning by viewing the display unit 106, even in a case where the user has stopped the warning without listening to the content of the warning.

In step S206, the control unit 101 determines whether the condition for issuing the second warning is satisfied. If the condition for issuing the second warning is satisfied (YES in step S206), the processing proceeds to step S207. If the condition for issuing the second warning is not satisfied (NO in step S206), the processing proceeds to step S210. In the present exemplary embodiment, there will be described a case where the control unit 101 determines that the warning about the camera shake is at the level 2 as illustrated in FIG. 3B, in step S206.

Here, the second warning will be described. When the release switch is half-pressed, the control unit 101 starts preparation operation for imaging. Accordingly, in the present exemplary embodiment, the second warning includes only the warning about imaging, without including the warning about the operation state of the camera in the standby state. The reason is as follows. If the release switch is half-pressed, it is conceivable that the user intends to perform the image capturing. Thus, it is conceivable that the warning about the operation state of the camera is unnecessary. The condition for issuing the warning about imaging is similar to the condition described as the condition for issuing the first warning. However, in particular, the camera tilt amount and the camera shake amount may further greatly change, because half-pressing the release switch applies a physical force to the digital camera 100. In addition, the over- and under-exposure amount may greatly change caused by a factor such as an increase or decrease in the amount of sunlight. Accordingly, in the state where the release switch is half-pressed, the control unit 101 performs determination about the condition for issuing the warning about imaging.

Further, in the present exemplary embodiment, for example, a warning type and a level indicating a warning degree are set for each of the second warnings as illustrated in FIG. 3B, as with the first warning. The control unit 101 also performs processing based on priority, in a manner similar to the priority of the first warning described with reference to FIG. 3A. However, in a case where the type of the first warning and the type of the second warning are different, the control unit 101 issues the second warning regardless of the priority of the type. This corresponds to the state 1 to be described below with reference to FIG. 4. Referring back to FIG. 2, the description of the flowchart will be continued.

In step S207, the control unit 101 compares the first warning determined to be issued in step S201 and the second warning determined to be issued in step S206. In this case, for example, the control unit 101 makes the comparison of the warning type and the warning level. The first warning being on standby for notification in step S205 is also a target for the comparison in step S207.

Now, the relationship between the first warning and the second warning will be described with reference to FIG. 4.

In step S208, the control unit 101 determines whether to issue the second warning, based on the result of the comparison in step S206. If the control unit 101 determines that the second warning is to be issued (YES in step S208), the processing proceeds to step S209. If the control unit 101 determines that the second warning is not to be issued (NO in step S208), the processing proceeds to step S210.

Now, an example of a method for determining whether to issue the second warning will be described with reference to FIG. 4. Four states 0 to 3 are provided here as classifications.

The state 0 is a state where the first warning is not being issued. This is a state in the case where the control unit 101 determines that the condition for issuing the warning is not satisfied in step S201, or in the case where the control unit 101 determines that the sound of the first warning is not being output in step S204. In the case of the state 0, it is conceivable that the second warning is necessary for the user because the first warning is not being issued. Therefore, the control unit 101 determines that the second warning is to be issued.

The state 1 is a state where the type of the first warning and the type of the second warning are different. In the case of the state 1, it is conceivable that the second warning is necessary for the user regardless of the warning level, because the type of the second warning is different from the type of the first warning. Therefore, the control unit 101 determines that the second warning is to be issued.

The state 2 is a state where the type of the first warning and the type of the second warning are the same, and the level of the first warning is higher than or equal to the level of the second warning. In the case of the state 2, it is conceivable that the second warning is unnecessary for the user, because the type of the second warning is the same as the type of the first warning, and the level of the second warning is lower than or equal to the level of the first warning. As a result, the control unit 101 determines that the second warning is not to be issued.

The state 3 is a state where the type of the first warning and the type of the second warning are the same, and the level of the first warning is lower than the level of the second warning. In the case of the state 3, it is conceivable that the second warning is necessary for the user, because the type of the second warning is the same as the type of the first warning, but the level of the second warning is higher than the level of the first warning. As a result, the control unit 101 determines that the second warning is to be issued.

In the present exemplary embodiment, the first warning is of a type D and at the level 1, whereas the second warning is of the type D and at the level 2, as illustrated in FIGS. 3A and 3B. In other words, the warning types are the same, and the level of the first warning is lower than the level of the second warning and thus, the digital camera 100 is in the state 3. As a result, the control unit 101 determines that the second warning is to be issued.

As described above, the control unit 101 can avoid issuing an unnecessary warning, by comparing the first warning and the second warning. For this reason, the user can recognize only a necessary warning sound. Referring back to FIG. 2, the description of the flowchart will be continued.

In step S209, the control unit 101 starts notification of the warning to the user by outputting a sound. For example, the control unit 101 starts outputting a voice message saying "the camera shake has increased" as the sound of the second warning, using the speaker 116. The digital camera 100 issues the warning in this case by reading the message aloud, so that the user readily understands the content of the warning. In a case where the plurality of second warnings is to be issued, the control unit 101 issues the second warnings, based on the priority and the level as described above.

The operation in step S208 and step S209 will be described with reference to FIGS. 5A to 5D. FIGS. 5A to 5D illustrate processing to be performed by the control unit 101 to output and stop the sound of the first warning and the sound of the second warning, based on a half press operation performed on the release switch. The sound of the first warning and the sound of the second warning are output through the speaker 116.

A step-shaped waveform illustrated in an upper part of each of FIGS. 5A to 5D represents the state of the release switch. This indicates that the state of the release switch is changed from the unpressed state to the half-pressed state by the user at a time t0. A rectangle 501 indicates a state where the sound of the first warning is output, and a rectangle 502 indicates a state where the sound of the second warning is output. An eighth note of each of the rectangle 501 and the rectangle 502 indicates that the warning sound is output for one second. In this case, a playback time period in which each of the sound of the first warning and the sound of the second warning is all output is five seconds.

FIG. 5A is a diagram illustrating an example of the notification of the warning when the digital camera 100 is in the state 0. As illustrated in FIG. 4, because the control unit 101 determines that the first warning is not to be issued in the state 0, the sound of the first warning is not output. In addition, because the control unit 101 determines that the sound of the second warning is to be issued in the state 0, the second warning is output.

FIG. 5B is a diagram illustrating an example of the notification of the warning when the digital camera 100 is in the state 1. The sound of the first warning is output by executing the above-described process in step S202. In a case where the release switch is half-pressed while the sound of the first warning is output, the sound of the first warning is stopped. This process corresponds to the processing in step S205 of FIG. 2. In FIG. 5B, the sound of the first warning is output for three seconds, and the output is stopped at the time t0. Further, because the control unit 101 determines that the second warning is to be issued in the state 1, the sound of the second warning is output.

FIG. 5C is a diagram illustrating an example of the notification of the warning when the digital camera 100 is in the state 2. The sound of the first warning is output by executing the above-described process in step S202. In a case where the release switch is half-pressed while the sound of the first warning is output, the sound of the first warning is stopped. This process corresponds to the processing in step S205 of FIG. 2. In FIG. 5C, the sound of the first warning is output for three seconds, and the output is stopped at the time t0. Further, because the control unit 101 determines that the second warning is not to be issued in the state 2, the sound of the second warning is not output.

FIG. 5D is a diagram illustrating an example of the notification of the warning when the digital camera 100 is in the state 3. The operation in the state 3 is similar to the operation in the state 1 illustrated in FIG. 5B, and thus it will not be described.

As described above, even when the same operation of half-pressing the release switch is performed, the control unit 101 determines whether to issue the next warning based on the warning type and the warning level, so that the user can receive a necessary warning. Referring back to FIG. 2, the description of the flowchart will be continued.

In step S210, the control unit 101 determines whether the release switch is being half-pressed. If the release switch is not being half-pressed (NO in step S210), the processing proceeds to step S211. If the release switch is being half-pressed (YES in step S210), the processing returns to step S206. The state where the release switch is not being half-pressed is, for example, a state where the half press of the release switch is canceled or a state where the release switch is full-pressed.

In step S211, the control unit 101 determines whether the sound of the second warning is being output. If the sound of the second warning is not being output (NO in step S211), the processing proceeds to step S213. If the sound of the second warning is being output (YES in step S211), the processing proceeds to step S212.

In step S212, the control unit 101 stops the sound of the second warning that has been output in step S208. Even in a case where another second warning is on standby for notification, the control unit 101 does not issue this second warning. The control unit 101 may visually display the second warning on the display unit 106. This enables the user to confirm later what type of second warning has been issued, even if the user has canceled the sound of the second warning.

Now, an example of processing for outputting the sound of the second warning will be described with reference to FIGS. 6A to 6D. FIGS. 6A to 6D are similar to FIGS. 5A to 5D, but a state where the release switch is full-pressed is also illustrated in each of FIGS. 6A to 6D. For the description, the digital camera 100 is assumed to be in the state 2 or the state 4, in each of FIGS. 6A and 6B. A rectangle 601 indicates a state where the sound of the first warning is output, and a rectangle 602 indicates a state where the sound of the second warning is output. An eighth note of each of the rectangle 601 and the rectangle 602 indicates that the warning sound is output for one second. Further, a playback time period during which each of the sound of the first warning and the sound of the second warning is all output is five seconds.

First, the sound of the first warning is output in the standby state before the time t0. Subsequently, the release switch is half-pressed at the time t0, so that the output of the sound of the first warning is stopped and the sound of the second warning is output.

FIG. 6A is a diagram illustrating an example of notification of the warning in a case where the half-pressed state of the release switch is canceled and changed to the unpressed state. Canceling the half-pressed state of the release switch indicates that the preparation operation for the imaging is stopped, and therefore, the control unit 101 does not issue the second warning. FIG. 6B is a diagram illustrating an example of notification of the warning in a case where the release switch is changed from the half-pressed state to the full-pressed state at a time t1. In a case where the release switch is full-pressed, the control unit 101 starts imaging, and therefore does not notify the second warning. This enables the user to avoid receiving an unnecessary second warning.

In a case where a time period between the time t0 and the time t1 is shorter than a predetermined time period, the sound of the second warning is not output. For example, the sound of the second warning is not output, in a case where the release switch is half-pressed by the user for a moment as illustrated in FIG. 6C or in a case where the release switch in the unpressed state is full-pressed (i.e., pressed in a stroke) as illustrated in FIG. 6D.

In step S213, the control unit 101 determines whether the power is turned off. If the power is not turned off (NO in step S213), the processing returns to step S201 and is continued. If the power is turned off (YES in step S213), the processing is ended.

The example of the processing of the digital camera 100 has been described above with reference to FIG. 2.

In a case where the condition about the warning being issued is determined to be at the level 0 in step S201 or step S206, the control unit 101 stops issuing the notification of the warning. For example, in a case where the control unit 101 determines that the camera shake amount has reached the level 0 while the notification of the warning about the camera shake is issued in step S201, the control unit 101 stops issuing the notification about the camera shake. Similarly, in a case where the control unit 101 determines that the camera shake amount has reached the level 0 while the notification of the warning about the camera shake is issued in step S206, the control unit 101 stops issuing the notification about the camera shake.

In the present exemplary embodiment, the same threshold is set for the first warning and the second warning if the types of these warnings are the same, but different thresholds may be set. This is because it is conceivable that there is a case where the user may perform an operation with higher accuracy than in the standby state, in a state where the preparation operation for image capturing is executed.

In the present exemplary embodiment, the first warning is output in a case where the condition for issuing the first warning is satisfied, and the second warning is output in a case where the condition for issuing the second warning is satisfied, but other condition can be set. Examples of such condition include a condition that a warning that has been output once is not output for ten seconds, and a condition that a warning at a level higher than the level in the last determination is output. In this way, a condition such as a condition that a warning that has been output once is not output for a predetermined time period or a condition that a warning is output based on a change in level may be set in the digital camera 100.

In a case where the mode is changed, the digital camera 100 stops the notification of the warning. For example, the digital camera 100 stops the notification of the warning, in a case where the power button is pressed or in a case where a transition from the playback mode to the still image capturing mode occurs. Further, if the digital camera 100 is in the power-on state, the digital camera 100 abandons information indicating the previous determination as to whether the condition for issuing the warning is satisfied, and determines whether to issue the warning again.

Figure 7:
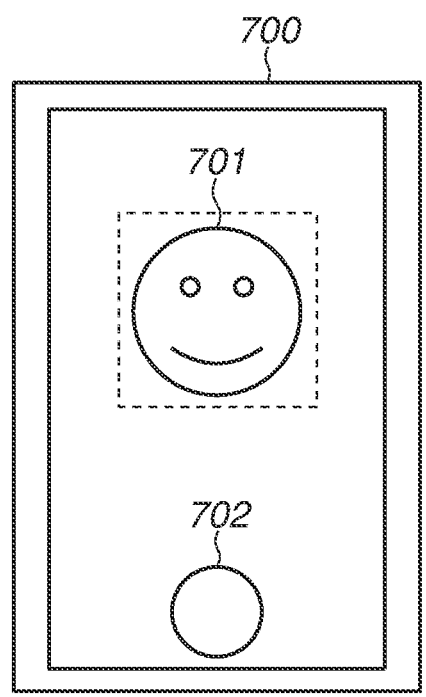
FIG. 7 is a diagram illustrating an example of operation of a smartphone according to the first exemplary embodiment.

However, for example, in a case where a smartphone is adopted as the electronic apparatus according to the present exemplary embodiment, the electronic apparatus may not have the release switch. In this case, the half press and the full press of the release switch can be replaced with other operations, for example, as illustrated in FIG. 7. In this case, a smartphone 700 illustrated in FIG. 7 has a configuration similar to the configuration of the digital camera 100. However, the smartphone 700 does not have the release switch.

The user touches an object 701 appearing on a display unit of the smartphone 700, so that the smartphone 700 executes processing such as bringing an object into focus. In other words, it can be considered that a touch on an object appearing on a screen of the smartphone 700 by the user causes the smartphone 700 to start preparation operation for imaging. In other words, the operation of touching the object appearing on the screen corresponds to the half press of the release switch. Further, when imaging the object 701, the user touches an item 702 for imaging, displayed on the screen of the smartphone 700. In response to this touch operation, the smartphone 700 images the object 701. In other words, the operation of touching the item displayed on the screen corresponds to the full press of the release switch.

In the present exemplary embodiment, the case where the digital camera 100 is in the still image capturing mode is described, but the present exemplary embodiment is applicable to other modes as well. However, the digital camera 100 may change the type of each of the first warning and the second warning to be issued. For example, in a case where the digital camera 100 is in the playback mode, the digital camera 100 does not issue the warning about imaging, because it is conceivable that the user does not perform an operation for image capturing. However, it is conceivable that the user may want to, for example, know the information about the battery capacity even if the digital camera 100 is in the playback mode. Therefore, the digital camera 100 notifies the user of the warning about the battery capacity. In this way, the digital camera 100 can change the type of the warning to be issued to the user, depending on the mode.

As described above, the user can stop the warning sound in the standby state (the sound of the first warning) by half-pressing the release switch. Further, the user can receive the warning sound for only a necessary warning before imaging (sound of the second warning) output by half-pressing the release switch.

Other Exemplary Embodiments

The present disclosure can also be implemented by supplying a program that implements one or more functions of the above-described exemplary embodiment to a system or an apparatus via a network or storage medium, and causing one or more processors in a computer of the system or apparatus to execute processing by reading out the program. The present disclosure can also be implemented by a circuit (e.g., an application-specific integrated circuit (ASIC)) for implementing one or more functions.

The present disclosure is not limited to the above-described exemplary embodiments, and can be embodied by modifying a component within a scope not departing from the idea of the present disclosure, in an implementation stage. Further, various exemplary embodiments can be implemented by appropriately combining a plurality of components described in each of the above-described exemplary embodiments. For example, some components may be removed from all the components described in each of the exemplary embodiments. Furthermore, components common to different ones of the exemplary embodiments may be appropriately combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-224129, filed Nov. 29, 2018, which is hereby incorporated by reference herein in its entirety.

What is claimed is:

1. An electronic apparatus comprising:
   an imaging unit;
   a user interface;
   a speaker configured to output a sound; and
   one or more processors,
   wherein the one or more processors receive a preparation instruction for causing the imaging unit to execute preparation operation for imaging and an imaging instruction for causing the imaging unit to execute imaging operation, based on a user operation, by the user interface, wherein the one or more processors output a sound relating to a first warning using the speaker, in a case where a condition for issuing the first warning is satisfied, wherein the one or more processors stop outputting the sound relating to the first warning, in a case where the preparation instruction is received by the user interface while the sound relating to the first warning is being output by the speaker, wherein the one or more processors do not output the sound relating to the first warning even when the condition for issuing the first warning is satisfied, in a case where the output of the sound relating to the first warning is stopped because of receiving the preparation instruction by the user interface, and wherein the one or more processors output a sound relating to a second warning different from the first warning using the speaker, when a condition for issuing the second warning is satisfied, in a case where the output of the sound relating to the first warning is stopped because of receiving the preparation instruction by the user interface.

2. The electronic apparatus according to claim 1, wherein the one or more processors issue a plurality of the first warnings in descending order of importance, in a case where the condition for issuing each of the plurality of the first warnings is satisfied.

3. The electronic apparatus according to claim 1, wherein the one or more processors output the sound relating to the second warning using the speaker, in a case where the condition for issuing the second warning is satisfied in a state where the electronic apparatus executes the preparation operation.

4. The electronic apparatus according to claim 1, wherein the one or more processors issue a plurality of the second warnings in descending order of importance, in a case where the condition for issuing each of the plurality of the second warnings is satisfied.

5. The electronic apparatus according to claim 1, wherein in a case where the one or more processors determine that a type of condition for issuing the first warning is a same type as the condition for issuing the second warning and the condition for issuing the second warning is satisfied, the one or more processors do not output the sound relating to the second warning while the sound relating to the first warning is output by the speaker.

6. The electronic apparatus according to claim 1, wherein in a case where the one or more processors determine that the condition for issuing the second warning is satisfied and that the condition for issuing the first warning is more important than the condition for issuing the second warning, the one or more processors do not output the sound relating to the second warning.

7. The electronic apparatus according to claim 1, wherein the one or more processors output the sound relating to the second warning when the condition for issuing the second warning is satisfied, in a case where the one or more processors determine that a type of condition for issuing the first warning is different from a type of condition for issuing the second warning or the condition for issuing the first warning is less important than the condition for issuing the second warning.

8. The electronic apparatus according to claim 1, wherein the one or more processors stop outputting the sound relating to the second warning, in a case where the electronic apparatus changes from a state where the electronic apparatus executes the preparation operation, to a different state, while the sound relating to the second warning is being output.

9. The electronic apparatus according to claim 1, wherein the one or more processors stop the output of the sound relating to the second warning, in a case where the one or more processors determine that the condition for issuing the second warning is not satisfied while the sound relating to the second warning is being output.

10. The electronic apparatus according to claim 1, wherein the second warning is a warning relating to imaging.

11. The electronic apparatus according to claim 1, wherein in a case where output of the sound relating to the first or the second warning is stopped by the one or more processors in response to receipt of an instruction by the user interface, the one or more processors do not output the sound relating to another warning that is on standby for notification.

12. The electronic apparatus according to claim 1, wherein the one or more processors stop the output of the sound relating to the first warning, in a case where the one or more processors determine that the condition for issuing the first warning is not satisfied, while the sound relating to the first warning is being output.

13. The electronic apparatus according to claim 1, wherein the one or more processors output the sound relating to the first warning using the speaker, in a case where the condition for issuing the first warning is satisfied and no operation is performed on the user interface, and wherein the one or more processors output the sound relating to the second warning using the speaker, in a case where the condition for issuing the second warning is satisfied and the preparation instruction is performed on the user interface.

14. The electronic apparatus according to claim 1, wherein the first warning is a warning relating to an operation state of a camera or a warning relating imaging.

15. The electronic apparatus according to claim 1, wherein the user interface is a release switch, wherein the one or more processors receive the preparation instruction for causing the imaging unit to execute preparation operation for imaging by the user interface, in a case where the release switch is half-pressed, and wherein the one or more processors receive the imaging instruction for causing the imaging unit to execute an imaging operation by the user interface, in a case where the release switch is full-pressed.

16. The electronic apparatus according to claim 1, further comprising a display unit, wherein the user interface is a touch panel on the display unit, wherein the one or more processors receive the preparation instruction for causing the imaging unit to execute preparation operation for imaging by the user interface, in a case where an object displayed on the display unit is touched via the touch panel, and wherein the user interface receives the imaging instruction for causing the imaging unit to execute imaging operation by the user interface, in a case where an item for imaging the object displayed on the display unit is touched via the touch panel.

17. The electronic apparatus according to claim 1, wherein the one or more processors determine whether to output the sound relating to the second warning when the one or more processors receive the preparation instruction by the user interface.

18. An electronic apparatus, comprising:
a user interface;
a speaker configured to output a sound; and
one or more processors,
wherein the one or more processors receive an instruction relating to imaging by the imaging unit, by the user interface,
wherein the one or more processors output a sound relating to a first warning using the speaker, in a case where a condition for issuing the first warning is satisfied,
wherein the one or more processors stop outputting the sound relating to the first warning, in a case where the one or more processors receive a user instruction relating to the imaging by the user interface while the sound relating to the first warning is being output by the speaker,
wherein the one or more processors do not output the sound relating to the first warning even when the condition for issuing the first warning is satisfied, in a case where the output of the sound relating to the first warning is stopped because of receiving the user instruction relating to the imaging by the user interface, and
wherein the one or more processors output a sound relating to a second warning different from the first warning using the speaker, when a condition for issuing the second warning is satisfied, in a case where the output of the sound relating to the first warning is stopped because of receiving the user instruction relating to the imaging by the user interface.

19. A control method for an electronic apparatus including an imaging unit, a user interface, a speaker configured to output a sound, and one or more processors, the control method comprising:
receiving a preparation instruction for causing the imaging unit to execute preparation operation for imaging and an imaging instruction for causing the imaging unit to execute imaging operation, based on a user operation, by the user interface;
controlling the speaker to output a sound relating to the first warning, in a case where a condition for issuing a first warning is satisfied;
controlling the speaker to stop outputting the sound relating to the first warning, in a case where the preparation instruction is received by the user interface while the sound relating to the first warning is being output by the speaker;
controlling the speaker not to output the sound relating to the first warning even when the condition for issuing the first warning is satisfied, in a case where the output of the sound relating to the first warning is stopped because the preparation instruction is received by the user interface; and
controlling the speaker to output a sound relating to a second warning different from the first warning, when a condition for issuing the second warning is satisfied, in a case where the output of the sound relating to the first warning is stopped because the preparation instruction is received by the user interface.

20. A non-transitory storage medium that stores a program for causing an electronic apparatus to execute a control method, the electronic apparatus including an imaging unit, a user interface, a speaker configured to output a sound, and one or more processors, the control method comprising:
receiving a preparation instruction for causing the imaging unit to execute preparation operation for imaging and an imaging instruction for causing the imaging unit to execute imaging operation, based on a user operation, by the user interface;
controlling the speaker to output a sound relating to the first warning, in a case where a condition for issuing a first warning is satisfied;
controlling the speaker to stop outputting the sound relating to the first warning, in a case where the preparation instruction is received by the user interface while the sound relating to the first warning is being output by the speaker;
controlling the speaker not to output the sound relating to the first warning even when the condition for issuing the first warning is satisfied, in a case where the output of the sound relating to the first warning is stopped because the preparation instruction is received by the user interface; and
controlling the speaker to output a sound relating to a second warning different from the first warning, when a condition for issuing the second warning is satisfied, in a case where the output of the sound relating to the first warning is stopped because the preparation instruction is received by the user interface.

* * * * *